United States Patent [19]

Kuzdrall

[11] Patent Number: 5,574,287
[45] Date of Patent: Nov. 12, 1996

[54] RESPONSE EXCURSION REDUCTION METHOD FOR RADIANT FLUX SENSORS

[76] Inventor: James A. Kuzdrall, P.O. Box 1247, Nashua, N.H. 03061

[21] Appl. No.: 359,511

[22] Filed: Dec. 20, 1994

[51] Int. Cl.$^6$ ...................................................... G01J 1/02
[52] U.S. Cl. ................... 250/395; 250/336.1; 250/472.1; 250/473.1; 250/205
[58] Field of Search ............................ 250/336.1, 472.1, 250/473.1, 393, 394, 395, 205

[56] References Cited

U.S. PATENT DOCUMENTS

| | | | |
|---|---|---|---|
| 3,611,173 | 10/1971 | Goulding et al. | 330/59 |
| 4,160,165 | 7/1979 | McCombs et al. | 250/205 X |
| 5,371,376 | 12/1994 | Iwanczyk | 250/370.12 |

FOREIGN PATENT DOCUMENTS 2154820  5/1973  Germany ................................ 250/205

Primary Examiner—Carolyn E. Fields
Assistant Examiner—Edward J. Glick

[57] ABSTRACT

A non-zero feedback radiant flux reduces a radiant flux sensor's primary response excursion by keeping the total radiant flux on the sensor virtually constant. An increase in signal radiant flux is countered by a virtually equal decrease in feedback radiant flux. Reduced primary response excursion suppresses the effects of energy storage mechanisms within the sensor. Smaller response excursions decrease the sensor's response time and nonlinearity. Since many radiant flux feedback sources are virtually noiseless, radiant flux feedback does not degrade the sensor's Noise Figure.

8 Claims, 9 Drawing Sheets

RESPONSE EXCURSION REDUCTION METHOD FOR RADIANT FLUX SENSORS

BACKGROUND OF THE INVENTION

1. Field of the Invention

The present invention relates generally to radiant flux sensors and, more specifically, to radiant flux sensing methods and apparatus which utilize radiant flux feedback to reduce response excursion.

2. Brief Description of Related Art

Many electromagnetic radiation sensors respond to input changes more slowly than desired. Energy storage within the sensor causes this delay. Physical mechanisms which store energy include electrical capacitance, semiconductor junction charge, and thermal capacitance. A detected signal must supply energy to the storage mechanism before the sensor's output can reach a full response. Conversely, when the input signal is removed, energy must be drained from storage before the sensor's output can subside.

A transimpedance amplifier (TIA), shown in FIG. 1, offered the best solution prior to this invention. A radiant flux sensor 24 receives an external signal radiant flux Hs. Radiant flux has units of watts. Radiant flux is the flow of electromagnetic energy onto (or through) a surface.

Sensor 24 produces a small current Ii in response to signal Hs. Current Ii creates a small voltage Vi at circuit node 20. The open-loop gain of amplifier 26 increases voltage Vi, producing an output voltage Vo. A feedback resistor Rf controls the closed-loop gain. Resistor Rf commonly has a large resistance, in the range of 1 megohms (1e6) to 1 teraohms (1e12).

Voltage Vo, a negative voltage, causes a current Ii' to flow in resistor Rf. Current Ii' is substantially equal to current Ii, differing only by the relatively small input current of amplifier 26.

In operation, output Vo moves through a relatively large voltage swing while input Vi moves a barely measurable swing. The high gain of amplifier 26 makes voltage Vi vanishingly small. Sensor 24 behaves as if its output current Ii were shunted by a resistance which is low compared to resistance Rf. The apparent shunt resistance is resistance Rf divided by the open-loop gain of amplifier 26.

A TIA greatly decreases the sensor output voltage excursion (change) which corresponds to a given signal change. A smaller output change means less energy must be stored or removed during the response. The TIA output responds in a shorter time because the sensor signal can satisfy the reduced energy storage change more quickly.

Definitions

A radiant flux sensor, as used herein, is an assembly comprising a radiant flux sensing transducer and other elements such as mounts, windows, lens, adjustments, and electronic components which support the transducer's operation.

A transducer transforms radiant flux into a different physical quantity, that new quantity being the primary response. A familiar primary response is the photocurrent produced in a photodiode. Thermal energy (heat), although less familiar, is the primary response for a large class of infrared sensors. Other primary responses include kinetic energy (photostriction), magnetic orientation, resistance, and electric potential.

Transducer are useful because their primary response is more easily processed and enhanced by available technology than is radiant flux. The primary response, however, may still not be the optimum form. The primary response is often again transformed, usually within the sensor assembly, to yet another physical quantity, a subsequent response. The usual subsequent response is a voltage change (a photocurrent changed to a voltage by a load resistor) because electronic processing is inexpensive and advanced. Subsequent response may, however, take other forms such as displacement, resistance, reflectance, or current.

Sensors with a non-electronic primary responses may contain electronic elements. Passive electronic components and electronic amplifiers often serve to convert and process a non-electronic primary response.

An excursion, as used herein, is the largest positive value minus the largest negative value, both measured from the same reference value and both resulting from the same stimulus. Peak-to-peak value is another term for excursion. Excursion applies both to the radiant flux sensing transducer's primary response and to subsequent system responses that result from the primary response.

Prior Art Disadvantages

The TIA has a fundamental disadvantage. It can perform either with high signal detection sensitivity or with fast response time. An inherent shunt capacitance across any real resistor used for resistor Rf of FIG. 1 prevents the TIA from achieving both its highest sensitivity and its fastest response in the same circuit.

A high resistance at resistor Rf produces the lowest noise. Unfortunately, however, the reactance of resistor Rf's inherent shunt capacitance equals the high resistance at a relatively low frequency. As the frequency increases further, the reactance of the shunt capacitance dominates the feedback impedance. A smaller output voltage at voltage Vo creates the required feedback current Ii'. Consequently, the TIA's signal gain begins to drop at a relatively low frequency.

Prior Art Example

A practical example illustrates the severity of the TIA's sensitivity versus response time tradeoff. The circuit of FIG. 1 was constructed using a premium quality operational amplifier for amplifier 26, Analog Devices AD515AL. Resistor Rf was selected as a low noise resistor with only 0.2 pF (2e-13) shunt capacitance, Eltec Model 112. Sensor 24 was selected as a pyroelectric sensor type, Eltec Instruments Model 400. Model 400 has an inherent shunt resistance of 5 teraohms (5e12) and a shunt capacitance of 30 picofarads (30 pF). The sensor Model 400 by itself has an electrical response time equal to its resistance times capacitance product, 150 seconds.

To begin, the resistance of resistor Rf was chosen equal to the sensor resistance, 5e12 ohms. Resistor Rf injects unwanted Johnson (thermal) noise into input node 20 in FIG. 1. A high value for resistor Rf minimizes the injected noise. Selecting resistor Rf equal to 5e12 results in a Noise Figure of 5. (Noise Figure is the signal-to-noise power at the input divided by signal-to-noise power at the output.) The TIA has degraded the sensor's inherent sensitivity by a factor of 5, an acceptable result.

The TIA's response time with resistor Rf equal to 5e12 ohms is one second. A one second response is rather slow for most applications, albeit 150 times faster than that of the sensor itself.

Reducing the resistance of resistor Rf decreases the response time. Setting resistor Rf at 200 megohms (2e8) results in a 57 microsecond response time. (Lowering resistor Rf further creates excessive overshoot and oscillations.) The decreased response time comes at a price. The lower resistor Rf value increases the Johnson noise injected into input node 20. Resistor Rf has changed by about 4 orders of magnitude, and the noise power of resistor Rf's resistance has changed proportionally. The corresponding Noise Figure is 22235, a very serious degradation in sensitivity.

While 57 microseconds is fast, it is not fast enough for many important sensing instruments. For example, full-resolution television scanning requires 0.25 microsecond response time. The TIA cannot improve the pyroelectric sensor's response time enough for use in infrared television scanners, even when Noise Figure degradation is allowed.

The TIA has another disadvantage. Since the TIA only reduces the sensor s voltage swing, it is only effective for energy storage mechanisms related to voltage (such as capacitance and junction charge). The TIA does not reduce response current Ii. A ten-fold signal increase causes a ten-fold response current increase. Consequently, a response delay related to current storage, if present in the sensor, is not reduced by a TIA. Similarly, storage mechanisms such as heat capacity produce delays which the TIA cannot reduce.

The TIA has yet another disadvantage. Since the TIA does not reduce response current, any nonlinearity in the sensor's response current appears in the TIA output.

OBJECTS

Accordingly, it is the object of this invention to provide:

a) An apparatus which limits sensor response excursions but is not subject to the frequency limits imposed by shunt capacitance in real resistors.

b) An apparatus which limits sensor response excursions without connecting a feedback resistor to the sensor input node of the input amplifying device.

c) An apparatus which limits sensor response excursions without degrading the Noise Figure of the combined sensor and input amplifying device.

d) A method for limiting the excursion of a sensor's primary response that is equally effective for limiting subsequent response excursion.

e) A method for limiting the excursion of a sensor's primary response independent of the physical nature of the radiant flux sensing transducer, thereby extending the benefits of reduced excursions to a wide range of radiant flux sensing technologies.

f) A method for limiting the excursion of a sensor's primary response thereby reducing nonlinearity.

g) A method for limiting the excursion of a sensor's primary response which can be adapted to computer control techniques.

And further objects and advantages which will become apparent from a consideration of the drawings and ensuing description thereof.

It should be appreciated from the outset that although the instant invention will be described in connection with preferred embodiments and methods of use, the instant invention is not intended to be limited to these preferred embodiments and methods of use. For example, although the following discussion will proceed with reference being made to preferred forms of the instant invention, which forms are directed to radiant flux sensors which produce electrical outputs and which use electrical signal processing techniques, it should be appreciated that, in broadest form, the instant invention is equally applicable to other types of radiant flux sensors and processing methods (i.e. sensors and methods that do not utilize electronics). For example, the principles of the instant invention may be applied to radiant flux sensors and methods which utilize other physical parameters, such as changes in thermal energy, temperature, magnetization, pressure, and/or optical phenomena, either alone or in combination with electrical or electronic systems. Accordingly, the instant invention should be viewed broadly, and should only be limited to the hereinafter appended claims.

SUMMARY OF THE INVENTION

Radiant flux feedback provides a general method to reduce primary response excursions in radiant flux sensors. The method applies a non-zero feedback radiant flux to the sensor then adds or subtracts from that feedback the keep the sum of signal plus feedback virtually constant.

DESCRIPTION OF THE INVENTION, FIG. 2 TO FIG. 4E

FIG. 2 through FIG. 4E describe radiant flux feedback as a general method. As will be seen, the operating principle and application advantages are independent of specific sensor or source technologies.

Figure 1:
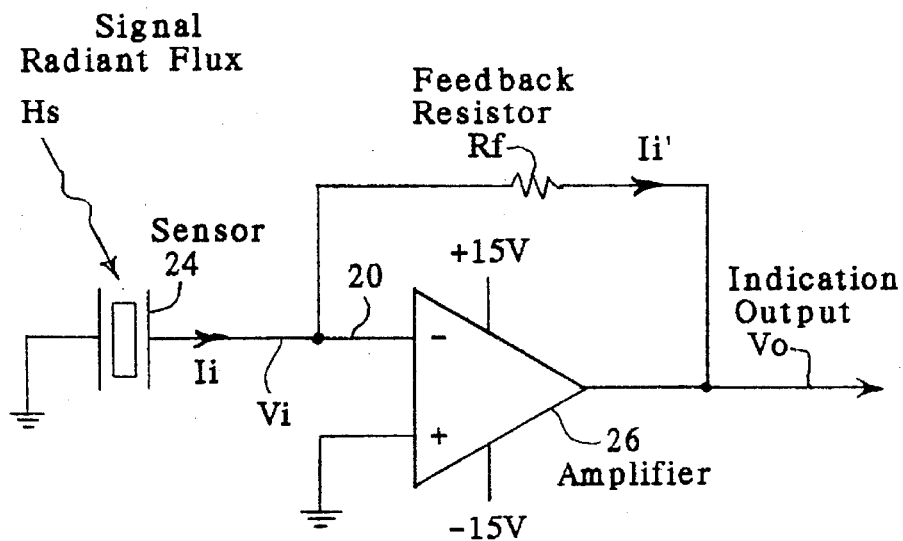
FIG. 1 shows the electrical circuit of the prior art transimpedance amplifier (TIA).
Figure 2:
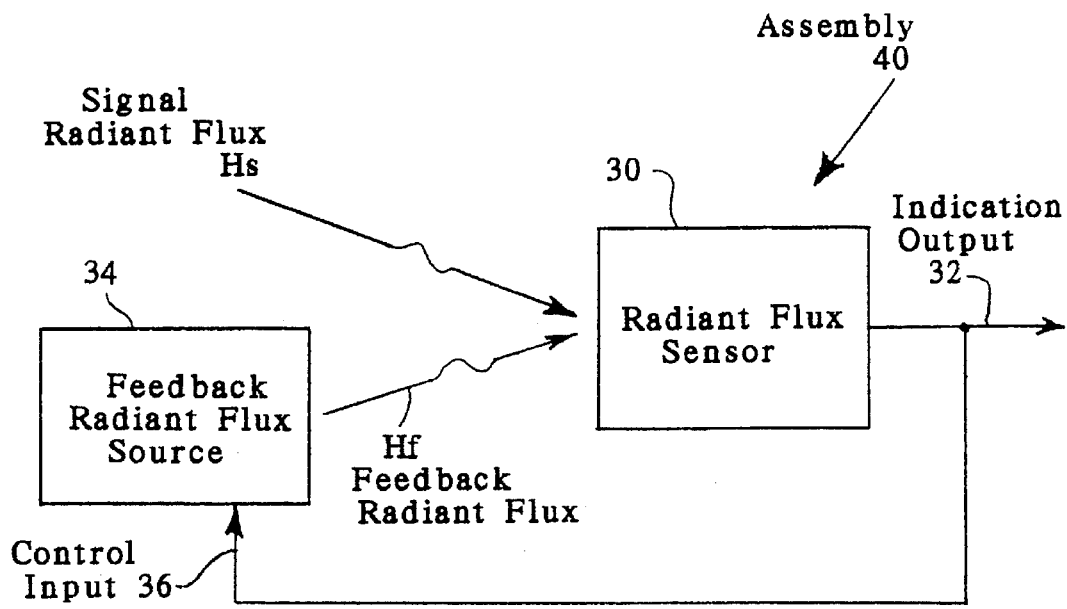
FIG. 2 shows a generalized apparatus which implements the radiant flux feedback method.

FIG. 2 shows the essential elements of the radiant flux feedback method. A radiant flux sensor 30 receives an external signal radiant flux Hs. Sensor 30 also receives a feedback radiant flux Hf from a feedback radiant flux source 34. Both signal Hs and feedback Hf must be in the spectral response range of sensor 30.

An indication output 32 from sensor 30 goes to a control input 36. Control input 36 regulates the intensity of feedback radiant flux Hf emitted from source 34. Source 34 responds to control 36 such that an increase in total radiant flux on sensor 30 causes a decrease in feedback Hf. That is, source 34 responds to output 32 in a way that keeps the sum of signal Hs and feedback Hf nearly constant.

Assembly 40, for later reference, comprises all the blocks and connections shown. Assembly 40 receives external signal radiant flux Hs and produces indication output 32.

FIGS. 3(A–D) provide a reference against which the invention's effect can be gauged. FIGS. 3(A–D) show plots of the internal responses of a generalized radiant flux sensor without the benefit of feedback radiant flux. Sensor 30 of FIG. 2 responds as shown in FIGS. 3(A–D) when feedback Hf is blocked or otherwise prevented from reaching sensor 30. Non-feedback sensor 30 refers to sensor 30 with feedback Hf blocked, equivalent to sensor 30 operating by itself.

Figure 3A:
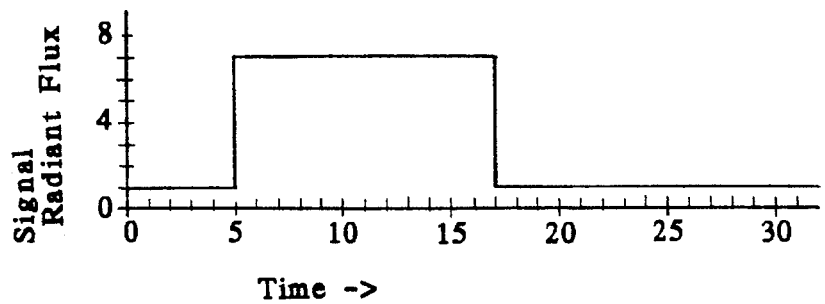
FIG. 3A to FIG. 3D shows the pulse response of a generalized radiant flux sensor.
Figure 3B:
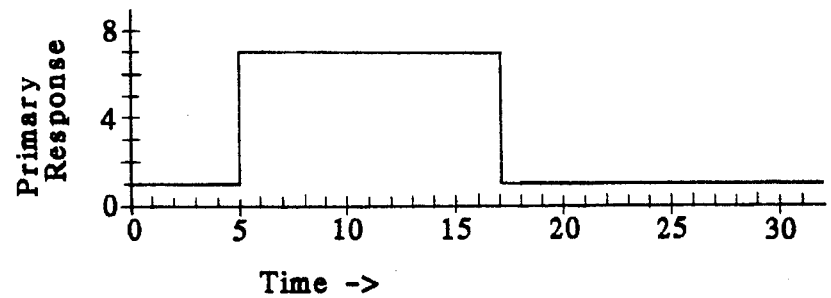

FIG. 3A is a plot of a signal radiant flux stimulus versus time. FIG. 3A represents signal Hs of FIG. 2. The vertical scale of FIG. 3A is in arbitrary power units. The horizontal scales of FIG. 3A through FIG. 3D all have in the same arbitrary time units. FIG. 3B plots the primary response of non-feedback sensor 30 versus time. The vertical units of FIG. 3B are arbitrary amplitude units.

Figure 3C:
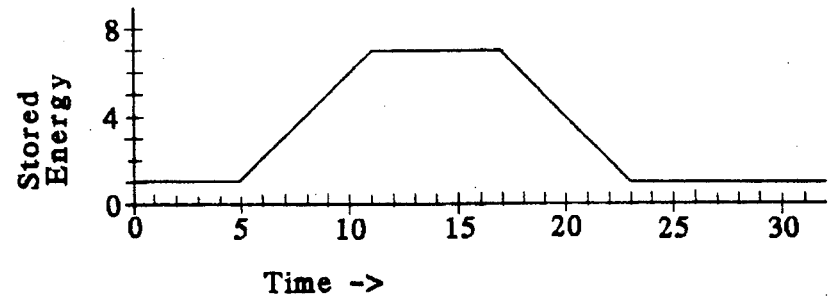
Figure 3D:
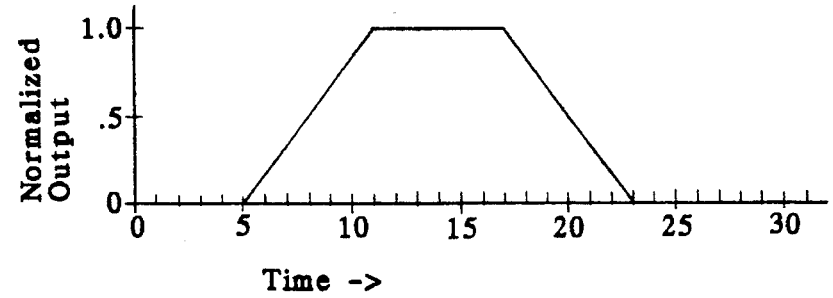

FIG. 3C plots the energy stored within non-feedback sensor 30. Energy is usually an exponential function of primary response, asymptotically converging on a final value. For simplicity, FIG. 3C plots stored energy changes as straight line approximations of the exponential in arbitrary energy units. The exact shape of the stored energy change versus time does not affect the conclusions reached hereafter. FIG. 3D shows the normalized pulse response of non-feedback sensor 30.

FIGS. 4(A–E) show the internal responses of sensor 30 with feedback radiant flux Hf as shown in FIG. 2. The positions of FIGS. 4(A and C–E) plots match the positions of FIGS. 3(A–D) plots with corresponding data.

Figure 4A:
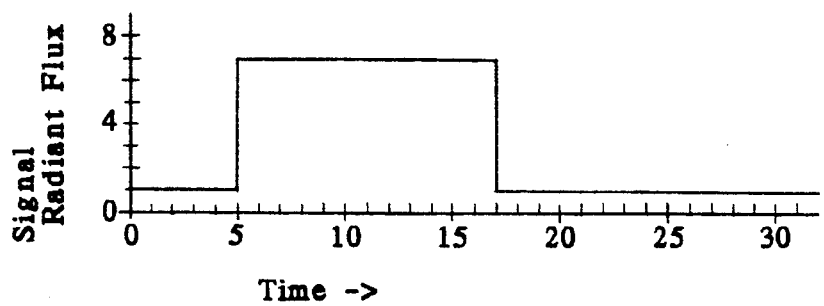
FIG. 4A to FIG. 4E shows the pulse response of a generalized radiant flux sensor which has been improved by the radiant flux feedback method.
Figure 4B:
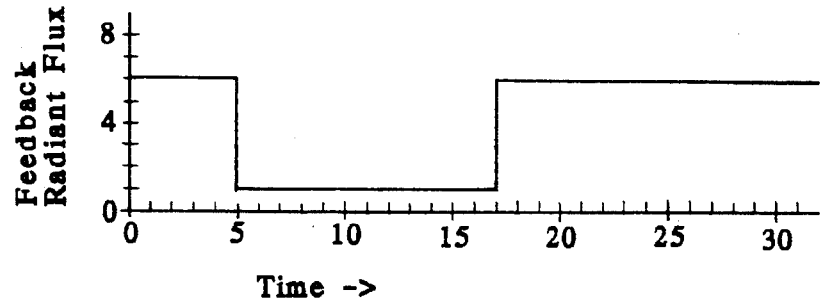
Figure 4C:
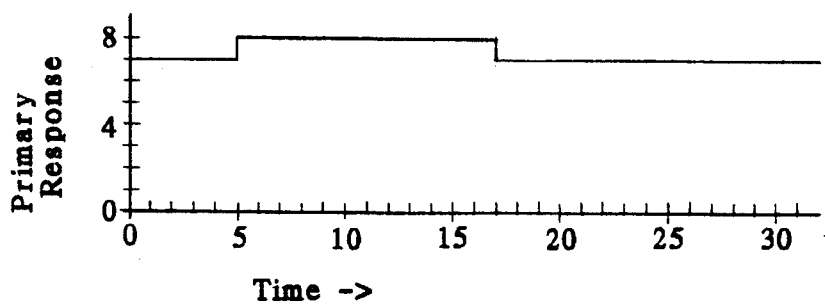

FIG. 4A is the same as FIG. 3A. FIG. 4B shows the new feature of the invention, feedback radiant flux Hf of FIG. 2. The scale units of FIG. 4B are the same as those of FIG. 4A. FIG. 4C shows the primary response of sensor 30 with feedback radiant flux present. FIG. 4C corresponds to FIG. 3B and has the same scale units.

Figure 4D:
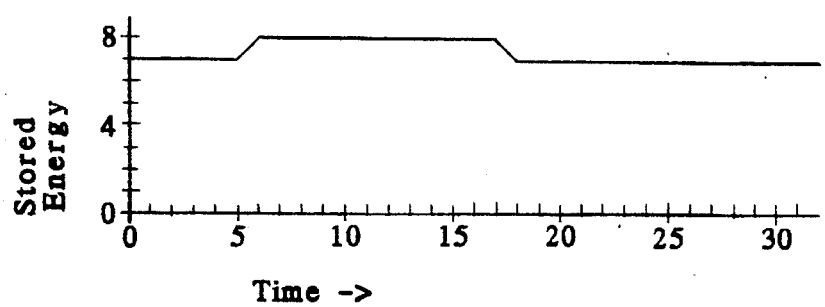
Figure 4E:
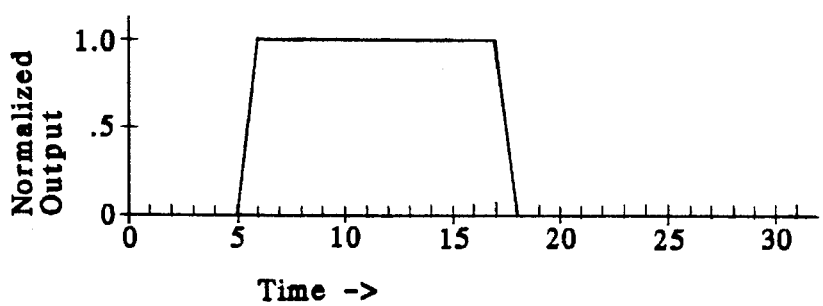

FIG. 4D shows the stored energy versus time resulting from the summed radiant fluxes of FIG. 4A and FIG. 4B. FIG. 4D and FIG. 3C have the same energy scale units and the same exponential approximation. FIG. 4E shows the normalized output of the generalized apparatus incorporating radiant flux feedback. The scale units of FIG. 4E and FIG. 3D are the same.

OPERATION OF THE INVENTION, FIG. 2 to FIG. 4E

First consider the internal responses of non-feedback sensor 30, the plots of FIGS. 3(A–D). In FIG. 3A, the signal radiant flux is 1 unit at time 0. This level persists until time 5 when the signal rises quickly to 7 units. The signal continues at 7 units until time 17 when it drops quickly back to its original level, 1 unit.

FIG. 3B shows the internal primary response of the sensor. A convenient scale has it rise 7 units at time 5 and drop 7 units at time 17.

FIG. 3C shows a straight line approximation of the sensor's stored energy versus time. In general, each level of primary response has a corresponding equilibrium energy storage level. An arbitrary scale makes the equilibrium energy storage level equal to the number of primary response units.

The primary response delivers energy to the energy storage mechanism at an arbitrary rate of one energy unit per time unit. It takes 6 time units for the 6 unit primary response change to raise the energy storage by 6 units. The energy change starts with the pulse at time 5 and ends 6 time units later at time 11.

When the pulse starts, at time 5, energy storage absorbs all of the primary response. For example, all of a photocurrent change initially goes into a photodiode's junction capacitance. As energy storage increases toward the equilibrium level, the amount of primary response available to create an output indication increases. In FIG. 3D, the normalized output reaches its full value, 1.0, only as the stored energy equilibrium is reached. Similar reasoning explains the slow drop in normalized output from time 17 to time 23.

Now consider the same sensor, same signal pulse, and same scale factors with feedback radiant flux applied. FIG. 2 shows the arrangement of the apparatus incorporating radiant flux feedback. The plots of FIGS. 4(A and C–E) correspond to those of FIGS. 3(A–D).

FIG. 4A shows a pulsed radiant flux, signal Hs in FIG. 2. FIG. 4B shows feedback radiant flux Hf responding to signal Hs. At time 0, feedback Hf is 6 units, and signal Hs is 1 unit. The total radiant flux on sensor 30 at time 0 is 6+1=7 units. At time 0, FIG. 4C shows a 7 unit primary response, which corresponds to a 7 unit radiant flux using the previously established scale factor. Likewise, FIG. 4D shows a 7 unit stored energy corresponding to a 7 unit primary response.

At time 5, signal Hs increases 6 units and, in response, feedback Hf decreases by 5 units. The arbitrary response ratio, −5/6, is purposely sized to show differences clearly on the plot scale. The total radiant flux on sensor 30 between time 5 and time 17 is 1+7=8 units. Correspondingly, FIG. 4C shows the primary response rise to 8 units for time 5 to time 17.

As previously established, one primary response unit changes the stored energy by one unit in one time unit. FIG. 4D shows the stored energy begin to rise at time 5. Also as previously established, the full energy limit for 8 primary response units is 8 stored energy units. With only one unit to rise, the energy storage requirement is satisfied in one time unit. Consequently, the normalized output reaches full response in one time unit.

Advantages of Radiant Flux Feedback

Comparing normalized outputs of FIG. 3D and FIG. 4E, feedback radiant flux decreased the response time from 6 time units to 1 time unit. The response time decreased (improved) by a factor of 6.

If feedback Hf had decreased by only 3 units, −3/6 of signal Hs, the net primary response would change by 6−3=3 units. The corresponding response time is 3 time units, a factor of 2 improved over the non-feedback sensor 30. In general, the improvement is Hs/(Hs−Hf). If feedback Hf decreases by 99% of signal Hs magnitude, the response time improves by 100. Further observe:

PRIMARY RESPONSE AFFECTED: Because feedback radiant flux has the same physical nature as signal radiant flux, it affects the same primary response.

EXCURSION REDUCED: When the feedback change opposes the signal change, the net radiant flux change on the sensor diminishes. The primary response excursion diminishes because the net radiant flux change is smaller.

SUBSEQUENT RESPONSE EXCURSION REDUCED: Subsequent response diminishes in proportion to primary response. Consequently, smaller primary response excursion results in smaller subsequent response excursion. Feedback radiant flux reduces energy storage delays for both primary and subsequent response excursion, accomplishing object d.

NONLINEARITY REDUCED: Smaller excursions reduce the contributions of nonlinear terms in any transfer function, a result well established in accepted theory. Radiant flux feedback reduces primary response and subsequent response excursions thereby reducing nonlinear effects. Object f is accomplished.

SENSOR INDEPENDENT: Feedback radiant flux reduces primary response excursion independent of the particular physical relationship between radiant flux and the primary response. Feedback radiant flux works with any radiant flux sensor, accomplishing object e.

In summary, feedback radiant flux opposes changes in signal radiant flux, thereby reducing primary response excursion. The preceding description does not depend on the specific technical characteristics of either sensor or source. Consequently, the radiant flux feedback method is applicable to many types of sensors and sources.

DESCRIPTION OF A GENERAL ELECTRICAL EMBODIMENT, FIG. 5

The general electrical embodiment adds practical detail to the general radiant flux feedback method. The added detail allows an analytic description of primary response excursion reduction.

Figure 5:
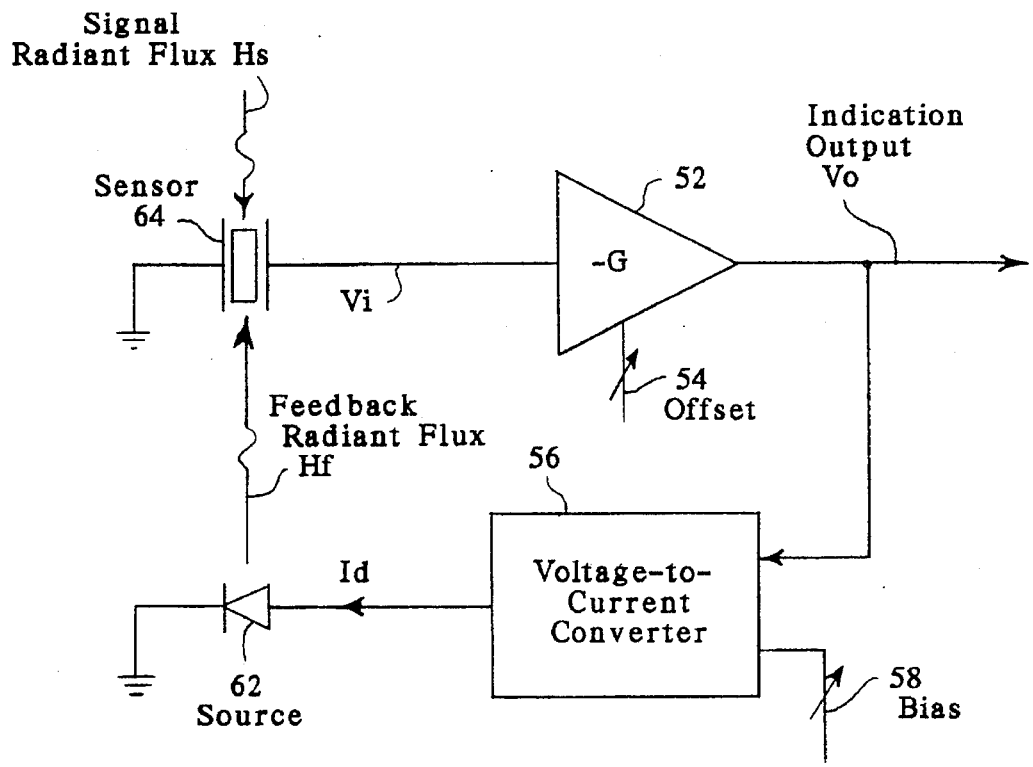
FIG. 5 shows the block diagram of an electronic embodiment which uses radiant flux feedback.

FIG. 5 shows the schematic elements for an electrical embodiment incorporating radiant flux feedback. A sensor 64 receives an external signal radiant flux Hs. Sensor 64 produces a small output voltage Vi. An amplifier 52 increases sensor 64's output to a useful level, producing an output voltage Vo. Amplifier 52 has a large inverting gain $-G$.

A voltage-to-current converter 56 produces a current Id. Current Id has two components. One component is a fixed, positive-flowing, predetermined value set by adjustment 58, the bias setting. Adjustment 58 produces a non-zero flow at current Id when voltage Vo is zero.

The second component of current Id is responsive to variable voltage Vo. The variable component of current Id adds to or subtracts from the fixed component of current Id. Positive-going changes in voltage Vo cause converter 56 to add to the total current Id. Conversely, negative-going changes in voltage Vo cause converter 56 to subtract from the total current Id. The variable component of current Id is zero when voltage Vo is zero.

Current Id excites a radiant flux source, shown as a light emitting diode source 62, the feedback source. Source 62 produces a feedback radiant flux Hf. Feedback radiant flux Hf combines with signal radiant flux Hs on sensor 64.

Feedback radiant flux Hf has two components, corresponding to the two components of current Id. The bias component of current Id produces a bias component in feedback radiant flux Hf. The bias component of feedback Hf is preferably set by adjustment 58 at a level slightly greater than the largest expected signal radiant flux Hs.

The variable component of current Id creates a variable component in feedback radiant flux Hf which adds to or subtracts from the fixed component of radiant flux Hf. The variable component of current Id and, consequently, the variable component of radiant flux Hf are both zero when voltage Vo is zero.

Sensors which respond to steady levels (DC-responding sensors) produce a steady input voltage Vi in response to the steady bias component of feedback Hf. Amplifier 52 includes an optional offset adjustment 54 to counter the steady component of input voltage Vi, should it be present. Offset adjustment 54 brings output voltage Vo to zero when signal Hs is zero.

To eliminate numeric complexity in the following discussion, assume that one watt of radiant flux Hs produces one volt at voltage Vi. Further, assume that one volt at voltage Vo produces one watt of radiant flux Hf.

OPERATION OF A GENERAL ELECTRICAL EMBODIMENT, FIG. 5

Adjustment 58 sets source 62 to produce a non-zero bias radiant flux Hf when signal Hs is zero. When signal Hs rises to amplitude F, output voltage Vo becomes more negative, tending to reduce feedback Hf.

The feedback level which satisfies the circuit loop is less than the bias feedback level by $F*(G-1)/G$, an amount virtually equal to F when G is very large. The corresponding input voltage Vi which satisfies the circuit loop is F/G. Without feedback, signal level F produces F volts at input Vi. With feedback, signal level F produces only F/G volts at input Vi.

Feedback radiant flux reduces the sensor's voltage change by a factor 1/G, reducing the response excursion as desired. The smaller response excursion reduces response time and nonlinearity in sensor 64 by the factor 1/G.

Despite the large input signal reduction, the gain of amplifier 52 substantially restores the level at voltage Vo, the normal output of the sensing apparatus. The reduced input at voltage Vi, F/G, is immediately subjected to the amplifying action of amplifier 52, a gain of $-G$. The amplified output is $(-G)*Vi=(-G)*(F/G)=-F$. Magnitude F is the same sensor response magnitude that would occur at voltage Vi if there were no reduction due to feedback.

In summary, a signal radiant flux increase produces a nearly equal feedback radiant flux decrease by subtracting from the bias component of the feedback radiant flux. Consequently, sensor 64 operates at virtually the same total radiant flux for all signals up to the magnitude of the bias component of the feedback radiant flux.

Since the total sensor radiant flux changes by only F/G, the sensor's primary response—be it photocurrent, thermal energy, electronic charge, or kinetic energy—changes by only F/G rather than by F. The sensor's primary response excursion decreases by a factor F/G (new) divided by F (original) equals 1/G. Consequently, radiant flux feedback suppresses energy storage delays in any physical energy storage mechanism present in the sensor. Nonlinearity is also suppressed because the primary response excursion has been reduced.

DESCRIPTION OF A SPECIFIC ELECTRICAL EMBODIMENT, FIG. 6

Figure 6:
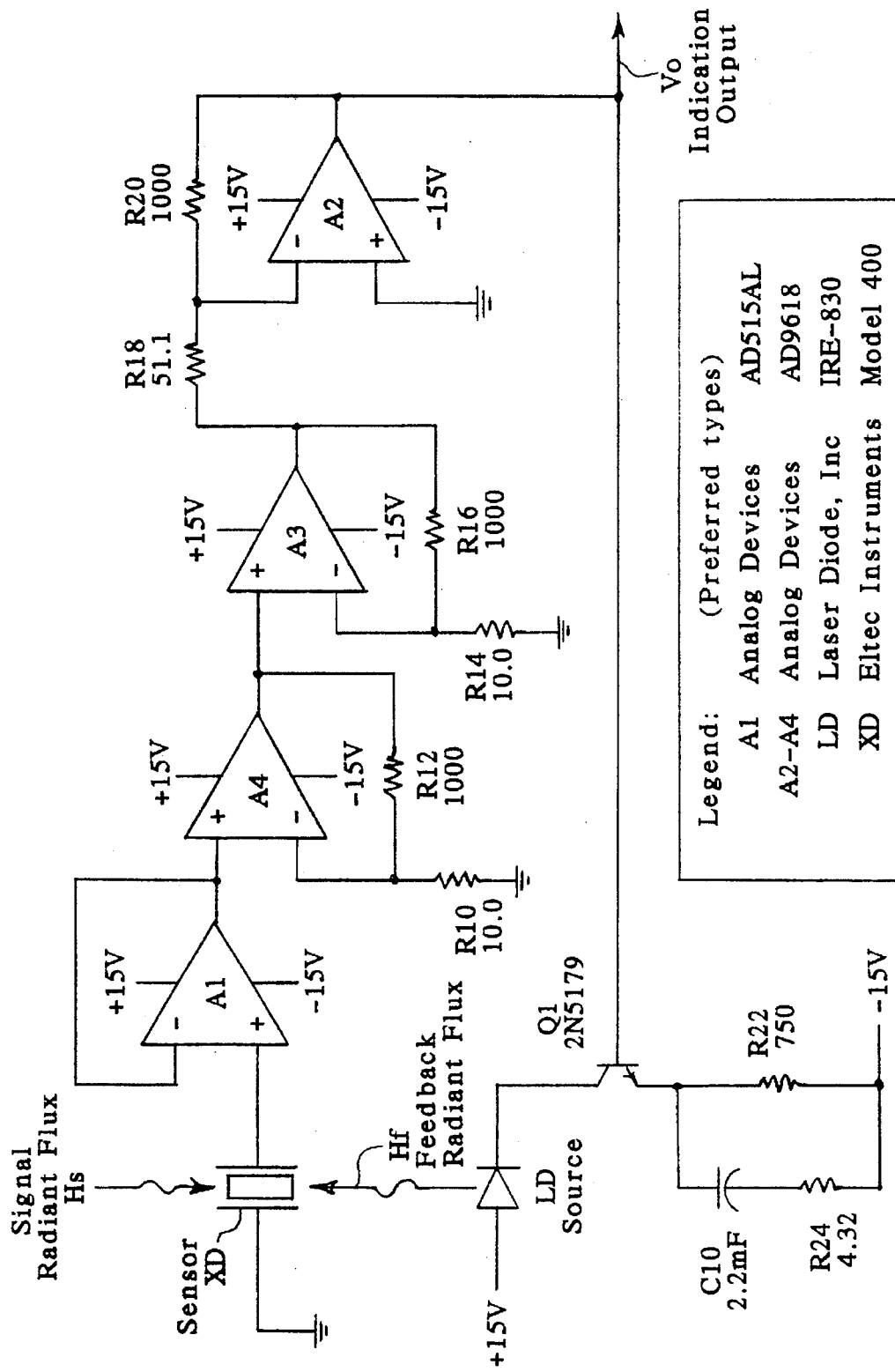
FIG. 6 is a practical electronic circuit which incorporates radiant flux feedback.

FIG. 6 implements the general electrical embodiment in a specific practical circuit. The circuit uses the same sensor and same input amplifier as the prior art TIA example, allowing a direct performance comparison. The radiant flux feedback circuit has 303 times quicker response time and 5560 times better Noise Figure than the prior art TIA.

A radiant flux sensor XD receives an external signal radiant flux Hs. Sensor XD corresponds to sensor 64 in FIG. 5 and serves the same function. Likewise, signal Hs has the same function in FIG. 5 and in FIG. 6.

Sensor XD is a pyroelectric type, Eltec Model 400. Pyroelectric sensors respond to the heating effects of radiation, independent of the radiation wavelength. They are useful from the soft x-ray region to the far infrared region of the radiation spectrum.

The primary response of a pyroelectric transducer is heat energy. A subsequent response is temperature rise. In yet another subsequent response, pyroelectric transducers produce or absorb electrons when their temperature rises or falls. Storage of electrons in the sensor's capacitance dominates the response delay.

The transducer in sensor XD is a thin circular disk of lithium niobate crystal, about 0.05 mm thick and 2 mm in diameter. Since it responds to heat, both sides of the disk are equally sensitive to radiant flux. The disk ordinarily mounts in a TO-5 transistor can (case) with a radiation-transmissive window replacing the metal top. A preferred configuration has signal radiant flux Hs arriving through the window onto the top surface of the disk.

A light emitting diode source LD produces a feedback radiant flux Hf. Source LD corresponds to source 62 in FIG. 5 and serves the same function. Likewise, feedback Hf has the same function in FIG. 5 and in FIG. 6.

Feedback radiant flux Hf arrives on the bottom surface of sensor XD's transducer disk. To accomplish this, source LD mounts under the disk on the base of the TO-5 can. A space between source LD and the transducer disk allows feedback radiant flux Hf to spread even illumination.

Signal Amplifier

Sensor XD connects directly to an amplifier A1, Analog Devices AD515AL. Amplifier A1 is preferably an unpackaged die mounted within the TO-5 can. Amplifier A1 has very low input bias current, typically 35fA (35e-15) at 25 C. The internal shunt resistance of sensor XD, typically 5e12 ohms, supplies the input bias current to amplifier A1.

Amplifier A1 provides a voltage gain of 1. Amplifier A1 accepts signal voltage from sensor XD at an extremely high source resistance and produces a corresponding output voltage at a low source resistance to drive subsequent amplifiers. Noise from sensor XD and from the input of amplifier A1 dominates any noise produced by subsequent amplifiers.

A non-inverting amplifier A4 follows amplifier A1. Amplifier A4 is a wideband current-feedback amplifier, Analog Devices AD9618. A 1000 ohm feedback resistor R12 and a 10 ohm shunting resistor R10 configure amplifier A4 for a gain of about 100. Amplifier A4's response time is 4 ns, corresponding to a bandwidth of approximately 100 MHz.

A non-inverting amplifier A3, preferably Analog Devices AD9618, follows amplifier A4. A 1000 ohm feedback resistor R16 and a 10 ohm shunting resistor R14 configure amplifier A3 for a gain of about 100.

An inverting amplifier A2, preferably Analog Devices AD9618, follows amplifier A3. A 1000 ohm feedback resistor R20 and a 51.1 ohm input resistor R18 configure amplifier A2 for a gain of about −20. Amplifier A2's response time is 4 ns, corresponding to a bandwidth of about 100 MHz.

Amplifier A1 through amplifier A4 serve the same function as amplifier 52 of FIG. 5. The total gain of cascaded amplifiers A1, A2, A3, and A4 is about 1*100*100*(−20) equals two hundred thousand, inverting (−2e5). This gain corresponds to the symbolic gain −G in amplifier 52. An indication output Vo contains the amplified response to signal Hs.

The pyroelectric sensor XD produces no steady response to a steady radiant flux. Sensor XD responds only to changes in total radiant flux. Since sensor XD produces no steady output, amplifiers A1 through A4 do not require the voltage offset provided by adjustment 54 of FIG. 5.

Feedback Generator

A transistor Q1 serves as a voltage-to-current converter corresponding to converter 56 of FIG. 5. Transistor Q1 is a UHF-range NPN amplifier type, preferably a 2N5179. The total resistance in the emitter lead of transistor Q1 sets the current-to-voltage conversion factor. Transistor Q1's response time is about 2 ns, corresponding to a bandwidth of about 200 MHz.

A 750 ohm resistor R22 creates a fixed current bias of 20 mA through transistor Q1 and light emitting diode source LD. Resistor R22 corresponds to adjustment 58 of FIG. 5.

A 2.2 mF (2.2e-3) capacitor C10 and a 4.32 ohm resistor R24 increase the gain of converter transistor Q1 by decreasing the effective emitter resistance at frequencies above 180 Hz. The total effective emitter resistance above 180 Hz becomes asymptotic to 5.8 ohms as the frequency increases further. This total includes 4.32 ohms from resistor R24 and 1.5 ohms of emitter diffusion resistance from transistor Q1. The voltage-to-current conversion factor is 1/5.8 or 172 mA per volt.

Source LD is a fast-responding GaAlAs etched-well surface-emitting light emitting diode operating at a nominal wavelength of 830 nm, Laser Diode, Inc type IRE-830 being preferred. It responds to current changes in about 4 ns.

OPERATION OF A SPECIFIC ELECTRICAL EMBODIMENT, FIG. 6

The operation of the circuit in FIG. 6 parallels that of the general electrical embodiment. Signal Hs and feedback Hf both irradiate sensor XD. When signal Hf increases, amplifier 1 through amplifier 4 amplify the response. The amplified response increase appears as a voltage decrease at output Vo. The decrease at output Vo decreases the current in voltage to voltage- to-current converter Q1. Reduced current in converter Q1 reduces the feedback radiant flux produced by source LD. Consequently, an increase in signal Hs is countered by a nearly equal decrease in feedback Hf, keeping the total radiant flux on sensor XD virtually constant.

The circuit of FIG. 6 decreases the response time of sensor XD from 150 seconds to 190 nanoseconds. The response time improves by a factor of 789 million times. By comparison, a prior art TIA using the same sensor and same low-noise input amplifier decreases the response time to 57 us, an improvement of 2.6 million. This embodiment, enhanced by radiant flux feedback, is 303 times more effective than prior art for reducing response time.

The Noise Figure for the circuit of FIG. 6 is 4.0. The circuit of FIG. 6 detects radiant flux changes of 210 picowatts (210e-12) in a one Hertz bandwidth. By contrast, the Noise Figure for the prior art amplifier using the same sensor and low-noise input amplifier is 22235. The prior art amplifier detects radiant flux changes of 1.2 microwatts (1.2e-6)

in a one Hertz bandwidth. Radiant flux feedback improves the detection sensitivity by over 5560 times compared to prior art.

Amplifier A1 of FIG. 6 does not use a high resistance feedback resistor, eliminating problems with shunt capacitance. Object a is accomplished. Amplifier A1 has no feedback resistor connected to its input node, accomplishing object b. The dominating noise sources for this circuit are the Johnson noise from sensor XD and the inherent noise of amplifier A1, accomplishing object c.

DESCRIPTION OF A NON-ELECTRICAL EMBODIMENT, FIG. 7

Figure 7:
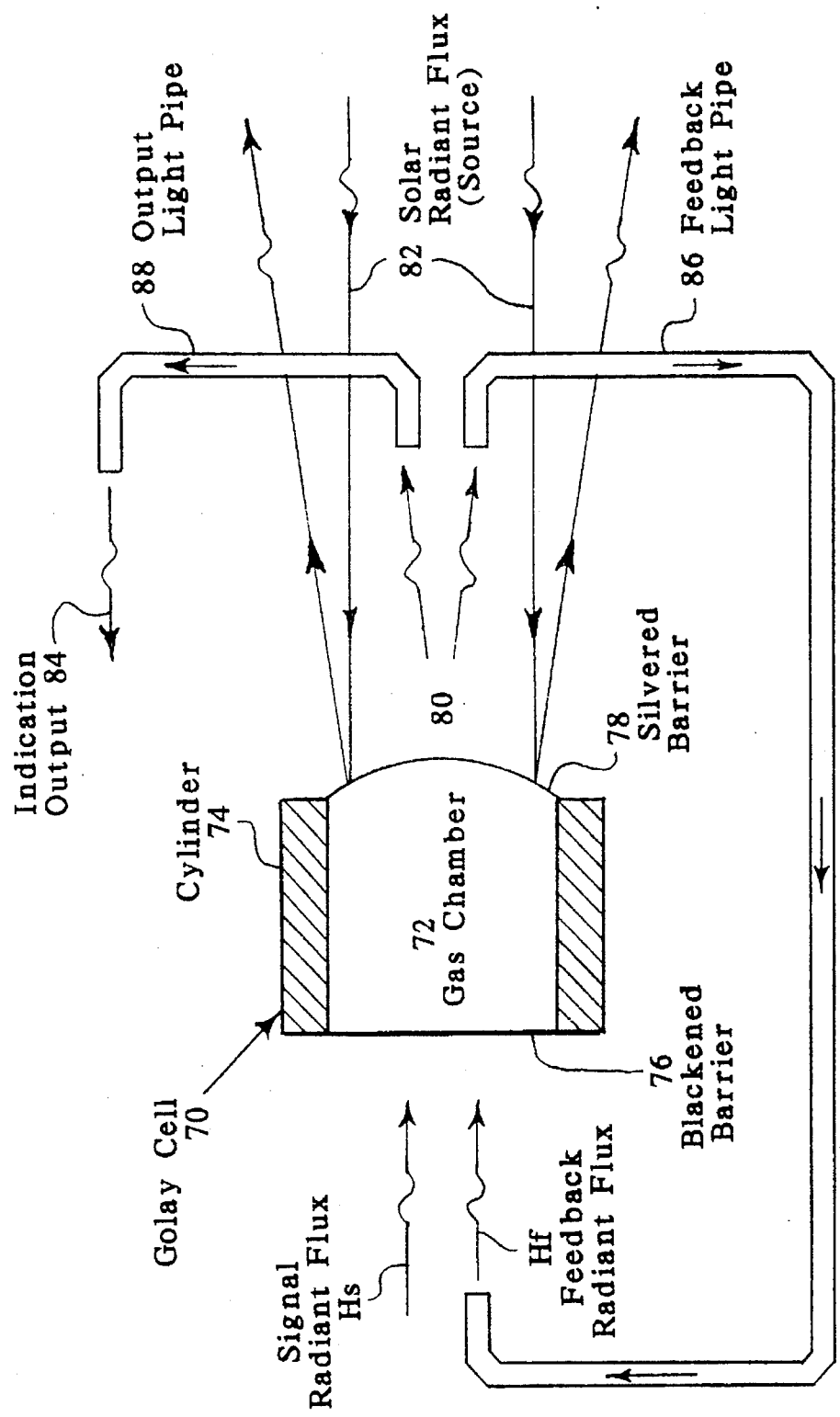
FIG. 7 shows an embodiment of the invention which uses no electronics.

FIG. 7 shows an embodiment adapted for use by interplanetary or orbital spacecraft. The embodiment uses no electrical parts, precluding semiconductor damage from neutrons, fast electrons, and high energy electromagnetic rays. Further, the embodiment uses no power from the spacecraft. This embodiment demonstrates the generality of the radiant flux feedback method.

The spacecraft lies between the sun and a signal radiant flux Hs. A Golay Cell assembly 70 serves as the sensor. Golay Cell 70 contains a sealed, gas-filled chamber 72. A rigid, thermally insulating cylinder 74, shown in cross section, forms the sides of chamber 72. A rigid, blackened, low heat capacity, thin barrier 76 seals the input end of chamber 72. A flexible, silvered, low heat capacity, thin barrier 78 seals the indication output end of chamber 72. The gas pressure in chamber 72 bows silvered barrier 78 outward.

A solar radiant flux 82 impinges on silvered barrier 78. Being bowed outward, silvered barrier 78 reflects a diverging radiant flux 80.

A light pipe 86, commonly constructed as a bundle of fiberoptic strands, intercepts some of diverging radiant flux 80 and redirects it onto blackened barrier 76. Feedback radiant flux Hf emanates from light pipe 86. A light pipe 88 intercepts some diverging radiant flux 80 and delivers it as an indication output 84. For simplicity, assume that light pipe 88 has the same entrance area and input flux density as does light pipe 86.

OPERATION OF A NON-ELECTRICAL EMBODIMENT, FIG. 7

When signal radiant flux Hs hits Golay Cell 70, blackened input barrier 76 absorbs it as thermal energy. The primary response of Golay Cell 70 is thermal energy. The thermal energy flows into the thermal capacity of blackened barrier 76 and of the chamber gas. A temperature rise results from the increase of stored energy.

The temperature rise in gas chamber 72 causes a pressure increase. The pressure increase further bows silvered barrier 78, which further spreads reflected radiant flux 80, which decreases the radiant flux density at the entrance of light pipe 86. Less radiant flux enters light pipe 86.

With less radiant flux captured, the feedback radiant flux Hf emanating from light pipe 86 decreases. The decrease in feedback Hf partially cancels the increase in signal Hs. Consequently, the input radiant flux excursion is reduced, the primary response (thermal energy) excursion is reduced, the subsequent responses (temperature rise, pressure rise, and bowing) are reduced, and the object of the invention is realized.

A numerical example illustrates the feedback effect. Assume Golay Cell 70 responds to signal Hs such that 1 uW (1e-6) of signal Hs causes a 1% decrease in radiant flux density at the inputs of feedback pipe 86 and indication pipe 88. Further assume that the solar intensity is such that feedback Hf is 10 mW (10e-3) with signal Hs zero. Output 84 is also 10 mW.

A 1 uW signal Hs change causes 1% less radiant flux to enter feedback pipe 86. The intercepted radiant flux changes by −0.01*10 mW=−100 uW for a 1 uW input change. The feedback loop gain (−G in FIG. 5) is −100.

When signal Hs increases from zero to 1 uW, feedback Hf decreases by 1 uW*(G−1)/G=0.99 uW. The net input increases to 10 mW−0.99 uW+1 uW=10.00001 mW. The reflected flux density changes by substantially −0.01%. Radiant flux feedback has reduced the input radiant flux excursion from 1 uW to 0.01 uW. Consequently, the primary response excursion has been reduced by a factor of 0.01 times. Likewise, the reflected flux density excursion, a subsequent response excursion, has decreased from −1% to −0.01%.

The FIG. 7 embodiment controls feedback intensity through use of a radiant flux modulator, silvered barrier 78, rather than through direct intensity control of source 82, the sun. Accordingly, this invention is not limited to any particular method of controlling feedback intensity and should be viewed as encompassing all known control methods.

In summary, the FIG. 7 embodiment, based on a Golay Cell sensor, demonstrates by example that the radiant flux feedback method is not limited to sensors with electronic output signals. Further, radiant flux feedback can be implemented in an apparatus without the use of electronic amplifiers or processing elements. Yet further, the radiant flux feedback method can make use of natural radiant flux sources, eliminating the power consumption of a local feedback radiant flux source. It is clearly evident that the radiant flux feedback method reduces primary response excursion in a broad range of configurations and technologies.

DESCRIPTION OF AN OPTOCOUPLER ADAPTATION, FIG. 8

An optocoupler enhanced by the radiant flux feedback method has faster response time, better linearity, and lower noise than optocouplers using prior art. The general embodiment of FIG. 2 becomes an optocoupler when a proximate radiant flux source generates signal Hs.

Figure 8:
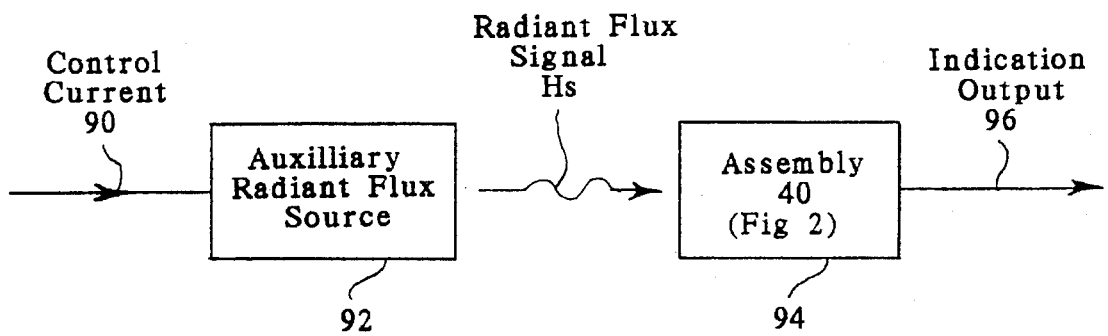
FIG. 8 shows the radiant flux feedback method applied to an optocoupler.

FIG. 8 shows a radiant flux sensing apparatus 94 accepting an input signal radiant flux Hs and producing an indication output 96. Apparatus 94 represents the invention's general configuration shown as assembly 40 in FIG. 2.

An auxilliary radiant flux source 92 produces signal Hs in response to an electrical control current 90. Source 92 may be a light emitting diode, laser diode, electron-excited phosphor, or other source suited to the application.

OPERATION OF AN OPTOCOUPLER ADAPTATION, FIG. 8

Control current 90 drives source 92 producing signal Hs. The magnitude of current 90 determines the intensity of signal Hs. Sensing apparatus 94 responds to signal Hs producing indication 96. Indication 96 is proportional to signal Hs and thus proportional to control current 90. Control current 90 and indication 96 are connected only through radiant flux Hs, achieving electrical isolation.

The optocoupler of FIG. 8 extends the benefits of radiant flux feedback to apparatus which accept electrical input rather than radiant flux input. Other applications include fiberoptic receivers.

DESCRIPTION OF AN ARRAY EMBODIMENT, FIG. 9

Figure 9:
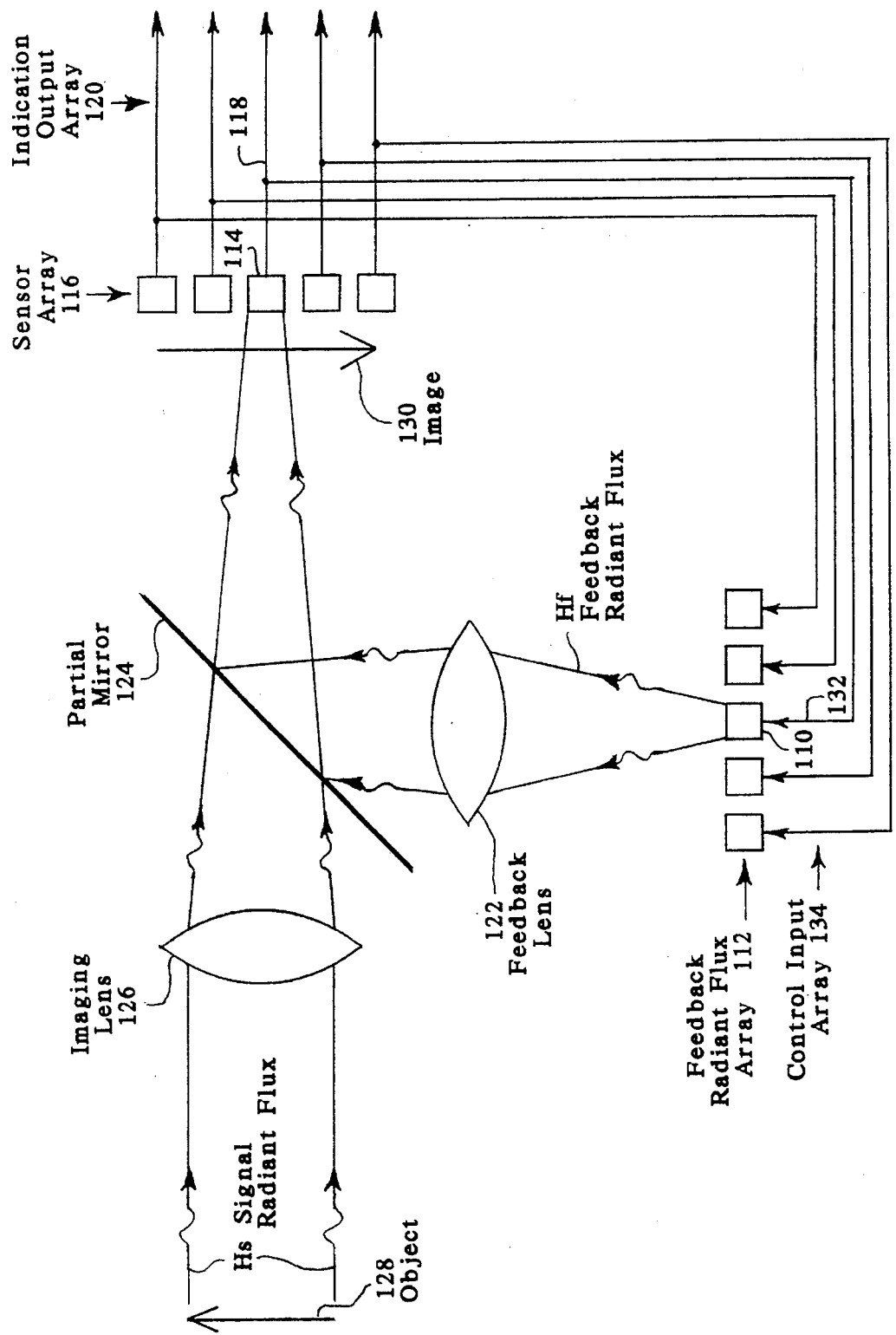
FIG. 9 shows the radiant flux feedback method applied to an array of sensors.

FIG. 9 shows the radiant flux feedback method applied to a sensor array. In this particular embodiment, a lens couples an array of five feedback sources and to an array of five sensors.

An object 128 radiates a signal radiant flux Hs which an imaging optical lens 126 intercepts. Lens 126 focuses the rays of object 128 onto a radiant flux sensor 114 forming an image 130. Sensor 114 has the same function as sensor 30 in FIG. 2. Four copies of sensor 114 and sensor 114 itself form a sensor array 116.

Signal Hs passes through a partial mirror 124 as it travels to sensor 114. The transmittance of partial mirror 124 affects the intensity of signal Hs which reaches sensor 114. Partial mirror 124 has a predetermined high transmittance for signal Hs, preferably 70%.

A radiant flux source 110 emits a feedback radiant flux Hf into a feedback optical lens 122. Source 110 has the same function as source 34 in FIG. 2. Lens 122 focuses an image of source 110 on sensor 114, feedback radiant flux Hf carrying that image.

Feedback radiant flux Hf reflects off partial mirror 124 as it travels to sensor 114. The reflectance of partial mirror 124 affects the intensity of feedback Hf which reaches sensor 114. Partial mirror 124 has a predetermined low reflectance for feedback Hf, preferably 10%. Four copies of source 110 and source 110 itself form a source array 112. The predetermined spacing and size of elements in array 112 and the predetermined focal length of lens 122 combine to produce an image of source array 112 on sensor array 116 wherein each source image substantially covers the receptive area of a corresponding sensor.

Sensor 114 has an indication output 118 which serves the same purpose as indication output 32 in FIG. 2. Sensor array 116 has an indication output array 120. Output 118 connects to a control input 132 of source 110. Input 132 serves the same purpose as input 36 of FIG. 2. Source array 112 has a control input array 134.

OPERATION OF AN ARRAY EMBODIMENT, FIG. 9

Object 128 emits or reflects radiant flux Hs which imaging lens 126 passes through partial mirror 124 then focuses on sensor array 116, forming image 130.

Source array 112 emits feedback radiant flux Hf which feedback lens 122 directs to partial mirror 124. The portion of feedback radiant flux Hf reflected from partial mirror 124 focuses on sensor array 116.

Sensor 114, output 118, input 132, and source 110 essentially constitute assembly 40 of FIG. 2 and perform the same function. Sensor array 116, output array 120, input array 134, and source array 112 form an array of radiant flux sensing assemblies. A group of such sensing arrays arranged side-by-side forms a sensing array for two dimensional images. Thus, the general embodiment of FIG. 2 adapts to sense image 130 in one or two dimensions, bringing all the benefits of the radiant flux feedback method to that task.

The lens-based embodiment of FIG. 9 is one of many ways envisioned to apply radiant flux feedback to image sensing arrays. For example, the pyroelectric transducer disk of sensor 64, FIG. 5 is sensitive on both sides. With pyroelectric sensors, source array 112 can be located directly beneath sensor array 116, eliminating lens 122 and partial mirror 124. Accordingly, the array embodiment should be viewed broadly with respect to configuration and component technology.

DESCRIPTION OF A COMPUTER-CONTROLLED EMBODIMENT, FIG. 10 AND FIG. 11

Figure 10:
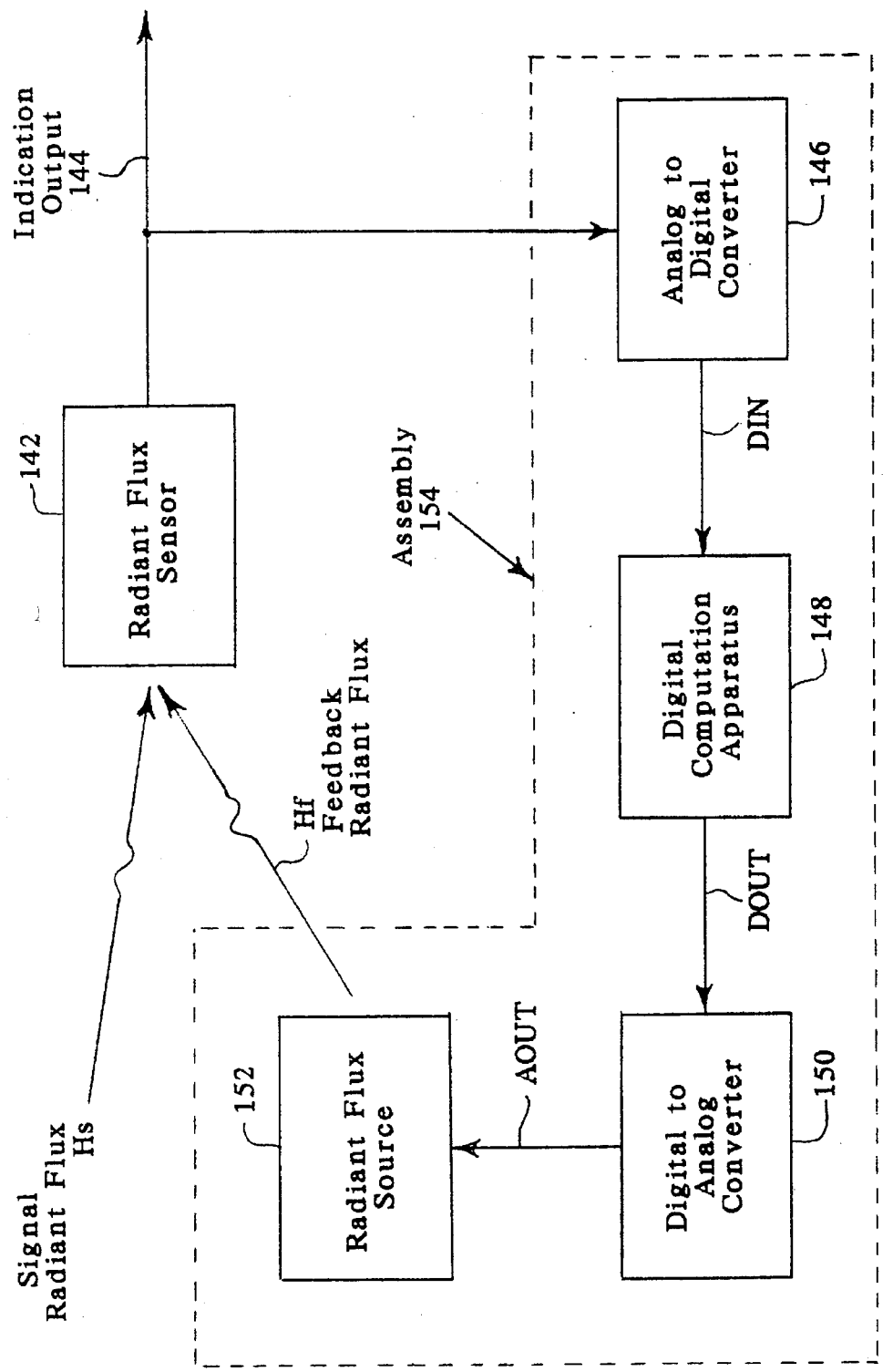
FIG. 10 shows a block diagram for computer control of radiant flux feedback.

FIG. 10 shows an embodiment which uses digital computer control. A signal radiant flux Hs enters a radiant flux sensor 142. Sensor 142 has the same function as sensor 30 of FIG. 2. Sensor 142 has an analog indication output 144. Output 144 increases when signal Hs increases.

An analog-to-digital converter 146 (ADC) converts analog output 144 to a digital result DIN and makes digital result DIN available to a digital computation apparatus 148 (computer) through a digital input line. Computer apparatus 148 processes input DIN from converter 146 and produces a digital control result at a digital output line DOUT. Output DOUT drives a digital-to-analog converter 150 (DAC). Converter 150 produced an analog control output AOUT which drives a radiant flux source 152 which produces a feedback radiant flux Hf. A digital value increase at output DOUT produces an analog value increase at output AOUT. Source 152 responds to an increase at output AOUT by producing more feedback radiant flux Hf.

An assembly 154 comprising converter 146, digital apparatus 148, converter 150, and source 152 essentially constitutes source 34 of FIG. 2 and serves the same function.

Figure 11:
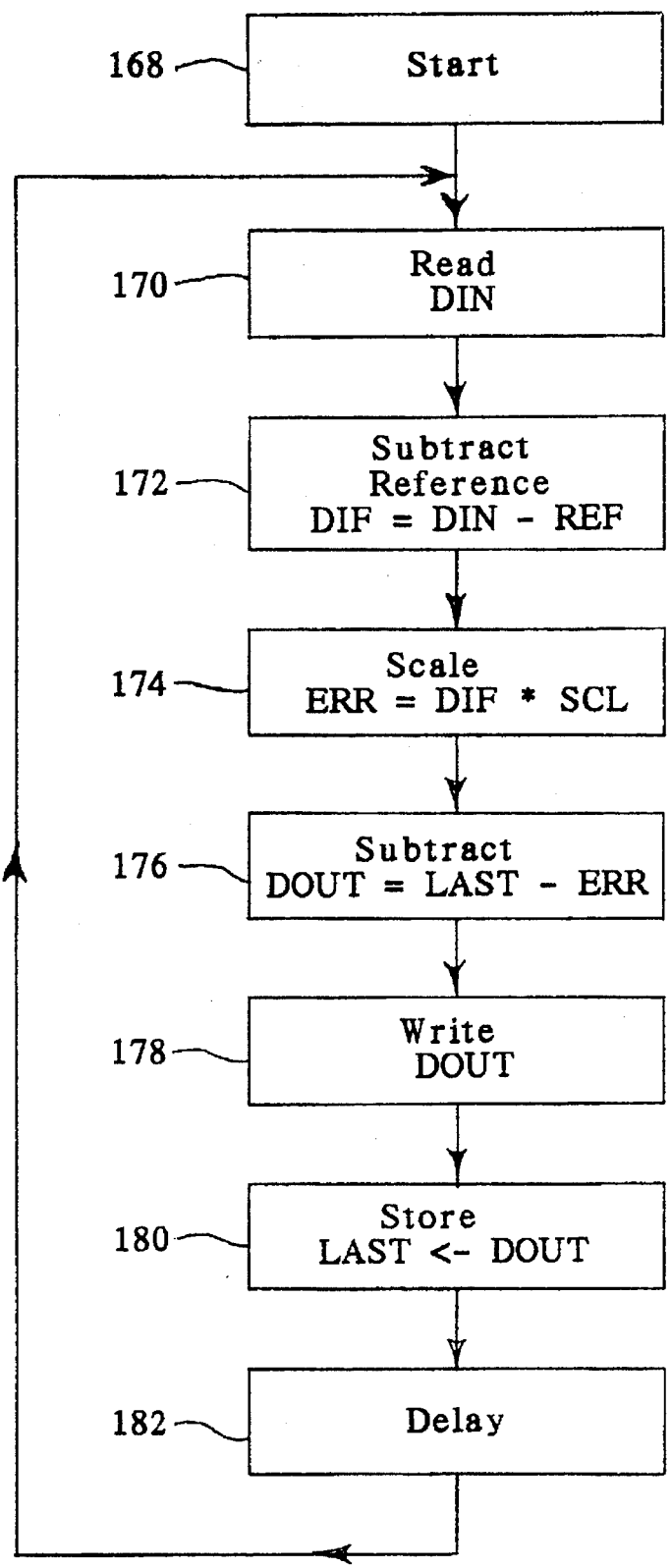
FIG. 11 is a flow chart for computer control of radiant flux feedback.

FIG. 11 shows a flow diagram of digital computation steps 168 to 182 by which digital apparatus 148 controls the embodiment of FIG. 10.

The embodiment of FIG. 10, when controlled in accordance with the flow diagram of FIG. 11, essentially constitutes assembly 40 of FIG. 2 and performs the same function.

OPERATION OF A COMPUTER-CONTROLLED EMBODIMENT, FIG. 10 AND FIG. 11

The operation of FIG. 10, being the operation of radiant flux sensing assembly 40 previously described, is now described in terms of the flow diagram of FIG. 11. All steps which follow refer to processes performed by digital computation apparatus 148:

A start step 168 proceeds to a read step 170 wherein the digital value of line DIN is read. A subtract step 172 follows wherein a predetermined value REF is subtracted from value DIN. Value REF is preferably near the midrange value of converter 146. A difference value DIF results.

A scale step 174 follows which adjusts value DIF by a predetermined multiplier SCL, producing a new value ERR. Multiplier SCL adjusts value ERR such that it will cause a change at input DIN that is slightly less than value DIF. Multiplier SCL suppresses digital overshoot and hunting. If multiplier SCL is one, scale step 174 is completed by implication.

A subtract step 176 computes a new value for output DOUT by subtracting value ERR from a stored digital value LAST. A write step 178 transfers the new value DOUT to converter 150 (DAC). A store step 180 puts the newly computed value DOUT in stored digital value LAST. A delay step 182 of predetermined duration, preferably zero, occurs next. After delay step 182 the process repeats, beginning at read step 170. The process repeats indefinitely.

Indication output 144 is the derivative of signal Hs. In many applications, the derivative form is the desired output. If need be, however, subsequent external processing can integrate output 144 to reproduce signal Hs.

The specific components of assembly 154 represent one of many arrangements possible. Likewise, the control flow of FIG. 11, closely related to the component choice, is one of many that may be devised, in part depending on the specific components of assembly 154. For example, converter 146 may be replaced by two comparators. One comparator, arranged with a predetermined reference, indicates when output 144 is "too high". The other comparator, appropriately arranged, indicates when output 144 is "too low". Computer 148 adjusts converter 150 in response to the two comparators.

In summary, FIG. 10 and FIG. 11 show by example that the radiant flux feedback method can be adapted to digital computer control. Those skilled in the art will appreciate that many alternatives and modifications may be made without departing from the invention.

THEORETICAL BASIS OF THE INVENTION

Several theoretical observations illustrate the practicality and uniqueness of this invention. Although I believe the following theories and observations to be correct, I do not wish to be bound by them.

LINEARITY: Feedback radiant flux does not degrade the input signal waveform. The summed feedback and signal radiant fluxes traverse a smaller portion of the transducer's transfer curve than the signal would have without radiant flux feedback. The small excursion results in less waveform distortion. The feedback radiant flux has the same spectrum as the signal, assuming a linearized feedback source. Two signals with the same spectrum produce the same harmonic products whether processed singly or together. Radiant flux feedback does not add frequencies to the signal's harmonic spectrum.

RESPONSE TIME: The source or amplification response time—whichever is longer—determines the maximum sensor response time improvement. (The AD515AL amplifier limits the FIG. 6 circuit.) This limit holds for any sensor with a single time constant.

SPECTRAL SEPARATION: The feedback radiant flux and the external signal radiant flux can be in different spectral regions. The sensor need not be as sensitive at the feedback wavelength as at the signal wavelength. Fast response, low cost, and other factors can dominate the feedback source choice, with only secondary consideration given to operating wavelength. Independently, the sensor choice can optimize spectral sensitivity at the signal wavelength, giving only secondary consideration to sensitivity at the feedback wavelength. Fast responding, commercial grade sources are only available in a few spectral regions. Spectral separation is an important practical advantage.

FEEDBACK NOISE: Common feedback sources are virtually noiseless at normal operating levels. Physical noise sources such as shot noise and diffusion resistance thermal noise increase proportionally to the square root of current or more slowly. In practice, the bias level can always be raised high enough to attain a desired signal-to-noise ratio. Furthermore, forward biased LEDs, incandescent lamps, and many other practical feedback sources generate virtually no inherent noise.

LOAD RESISTOR: The invention eliminates the sensor load resistor. A low-bias current input stage can use the internal resistance of the sensor as its bias current path. The invention thereby eliminates load resistor noise, improving the signal detection ability of the sensor. Prior art amplifiers could not make practical use of the sensor resistance because it produced a very long response time.

If necessary, an auxilliary bias resistor in shunt with the sensor can reduce the steady (DC) sensor voltage. DC sensor voltage comes from amplifier bias current flowing through the input node resistance. The auxilliary bias resistor's relatively small capacitance parallels that of the sensor. Consequently, the added resistor has little effect on response time. It does, however, add Johnson noise which degrades the Noise Figure.

GAIN: The invention has no critical gain requirements. The input amplifier can be a non-feedback source-follower FET stage optimized for low input current rather than gain. Such stages have a loosely controlled gain somewhat less than one. The gain primarily affects risetime and overshoot. The second-order transient response, easily achieved in most envisioned designs, is not critically sensitive to gain.

SUMMARY, RAMIFICATIONS, AND SCOPE

Thus the reader will see that radiant flux feedback decreases response time and nonlinearity for many combinations of sensors and feedback sources without introducing additional noise. Because this invention reduces the total radiant flux change rather than just the output voltage change, the improvements apply to all sensors not just those with physical storage mechanisms responsive to voltage.

While my above description contains many specificities, these should not be construed as limitations on the scope of the invention, but rather as an example of one preferred embodiment thereof. Many other variations are possible. For example: arrays constructed as integrated circuits, array feedback radiant flux derived from a cathode ray tube, fiberoptic assemblies, and others.

Accordingly, the scope of the invention should be determined not by the embodiments illustrated, but by the appended claims and their legal equivalents.

I claim:

1. A method for reducing a primary response excursion in a radiant flux sensor, said sensor having an indication output responsive to said primary response excursion, and said primary response excursion being caused by excursion in an external signal radiant flux, said method comprising the following steps:

a. applying a feedback radiant flux to said sensor that causes a response at said indication output; and b. setting said feedback radiant flux such that said feedback radiant flux is non-zero when said external signal radiant flux is zero; and c. adjusting said feedback radiant flux, said adjustment being responsive to a substantially exact replica of said indication output, said adjustment reducing said feedback radiant flux in response to increases in said external signal radiant flux, to reduce excursions of said indication output resulting from excursions of said signal radiant flux, whereby reducing said primary response excursion.

2. A radiant flux sensing apparatus with reduced primary response excursion, said apparatus comprising:

a. a radiant flux sensor subject to primary response excursion, said sensor having an indication output responsive to said primary response excursion, and said primary response excursion being caused by excursion in an external signal radiant flux;

b. means for providing a feedback radiant flux to said sensor that causes a response at said indication output; and c. means for setting said feedback radiant flux such that said feedback radiant flux is non-zero when said external signal radiant flux is zero; and d. means for adjusting said feedback radiant flux, said adjustment being responsive to a substantially exact replica of said indication output, said adjustment reducing said feedback radiant flux in response to increases in said external signal radiant flux, to reduce excursions of said indication output resulting from excursions of said signal radiant flux, whereby reducing said primary response excursion.

3. Apparatus as set forth in claim 2 wherein said adjusting means is an electrical circuit, said circuit being responsive to said indication output, said circuit controlling an input power to said feedback radiant flux providing means, and said feedback radiant flux providing means varying the intensity of said feedback radiant flux in response to said input power, whereby adjusting said feedback radiant flux.

4. Apparatus as set forth in claim 2 wherein said adjusting means is a radiant flux modulator, said modulator being responsive to said indication output, and said modulator altering the feedback radiant flux path such that the intensity of said feedback radiant flux reaching said sensor varies, whereby adjusting said feedback radiant flux.

5. Apparatus as set forth in claim 2 wherein said feedback radiant flux providing means is a light emitting diode subject to input power control by an electrical circuit responsive to said indication output.

6. Apparatus as set forth in claim 2 wherein an auxilliary radiant flux source responsive to external electrical control provides said external signal radiant flux.

7. An apparatus for reducing a primary response excursion in a plurality of radiant flux sensors, each of said sensors having an indication output responsive to said primary response excursion, and each of said primary response excursions being caused by excursion in an external signal radiant flux, said apparatus comprising for each of said sensors:

a. means for providing a feedback radiant flux to said sensor that creates a response at said indication output; and b. means for setting said feedback radiant flux such that said feedback radiant flux is non-zero when said external signal radiant flux is zero; and c. means for adjusting said feedback radiant flux, said adjustment being responsive to a substantially exact replica of said indication output, said adjustment reducing said feedback radiant flux in response to increases in said external signal radiant flux, to reduce excursions of said indication output resulting from excursions of said signal radiant flux, whereby reducing said primary response excursion.

8. Apparatus as set forth in claim 7 wherein said plurality of radiant flux sensors are arranged to form an array.

* * * * *